Jan. 8, 1963  M. E. HILLIER  3,072,269
BAR STOCK PUSH FEEDER
Filed July 15, 1958  4 Sheets-Sheet 1
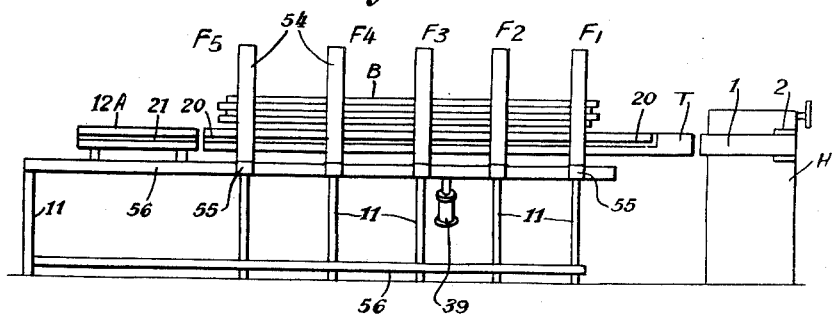
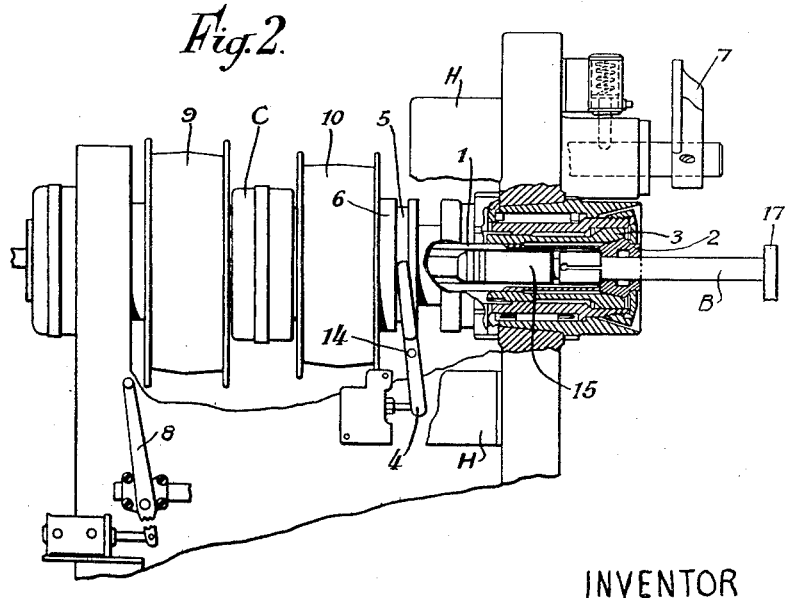
INVENTOR
MALCOLM EDWIN HILLIER
BY Dean Fairbank & Hirsch
ATTORNEYS Jan. 8, 1963
M. E. HILLIER
3,072,269
BAR STOCK PUSH FEEDER
Filed July 15, 1958
4 Sheets-Sheet 3
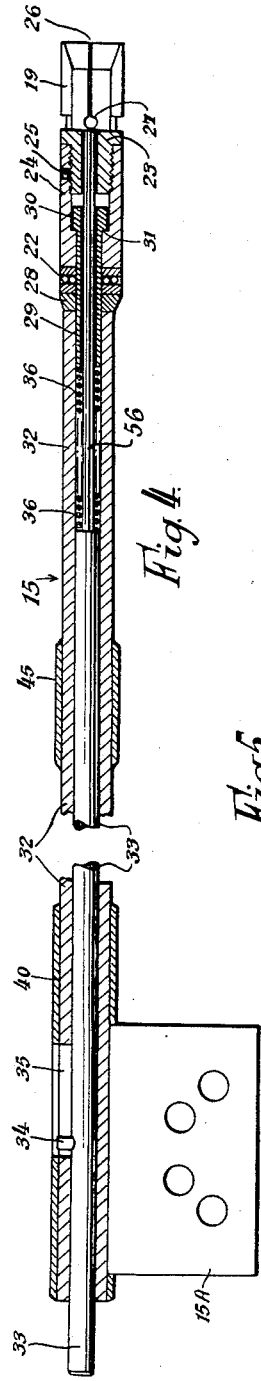
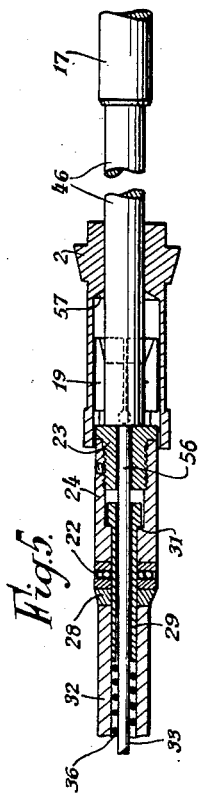
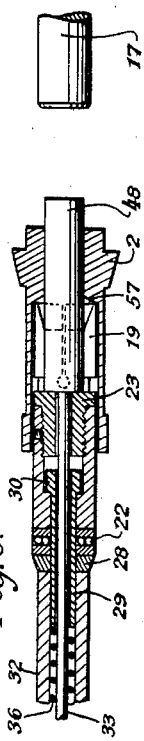
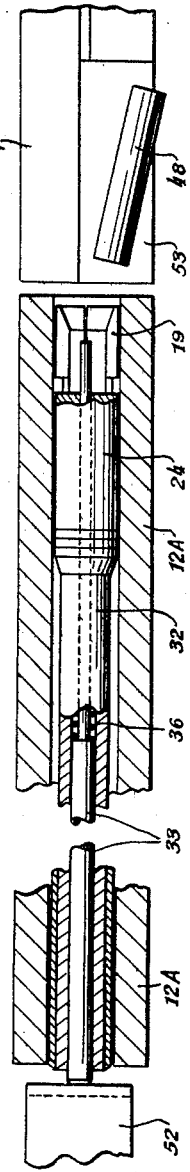
INVENTOR
MALCOLM EDWIN HILLIER
By Dean, Fairbank & Hirsch
ATTORNEYS

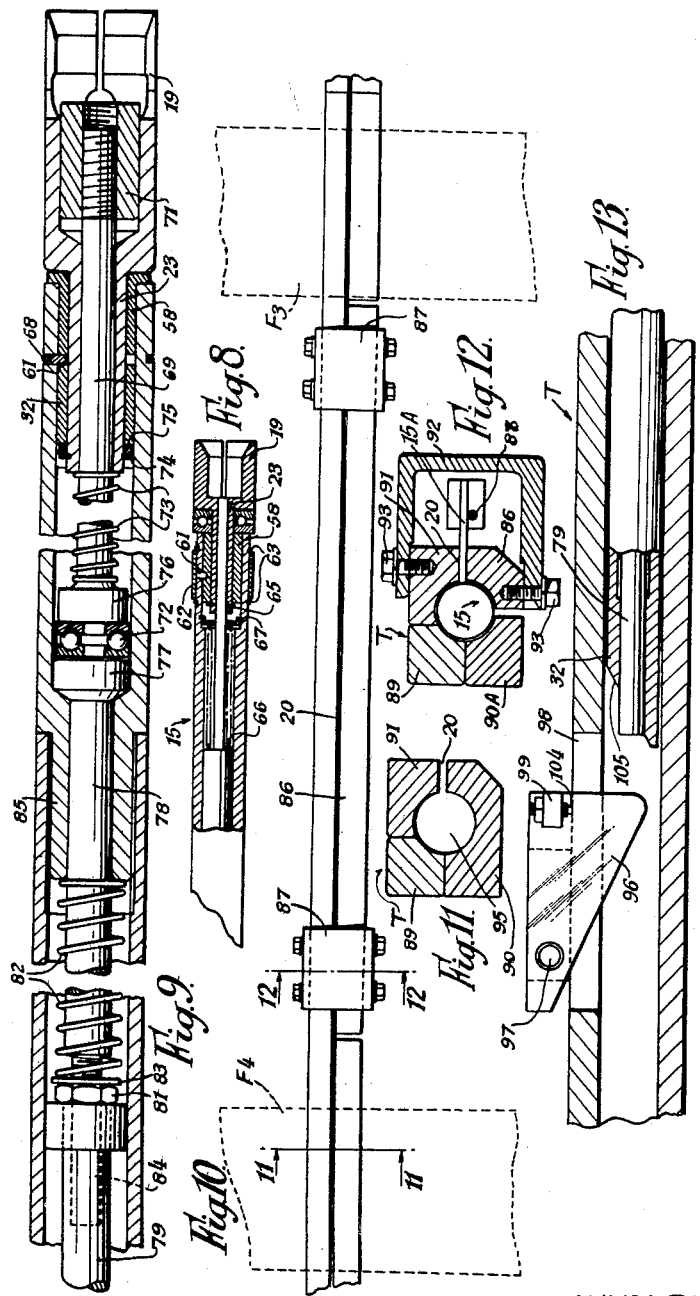

United States Patent Office 3,072,269
Patented Jan. 8, 1963

3,072,269
BAR STOCK PUSH FEEDER
Malcolm Edwin Hillier, Vicarage Crescent, London, England, assignor to Automation Limited, London, England
Filed July 15, 1958, Ser. No. 748,736
Claims priority, application Great Britain July 22, 1957
6 Claims. (Cl. 214—1.2)

This invention relates to actuating mechanism for feeding bar stock through the head stock of an automatic turning, screwing or like machine. In such a machine a long bar is fed forward by steps through a hollow rotating spindle in the head and at the end of each step is gripped by a collet in the head so as to leave a sufficient length of bar forward of the collet for operation by the several tools. When such a length on the forward end of the bar is substantially overhung, the end is supported firmly but rotatably by a rigid bearing so as to facilitate the use of tools to take heavy cuts or perform other operations.

In such machines the rotating collet in the head stock may be movable or non-movable as regards axial travel. In the non-movable type herein described the collet grips the bar close to the cutting or other operating tools but releases it at the end of a cycle of operations. The independent feed actuating mechanism then pushes the bar forward through the hollow spindle and the collet into a new position against a stop in the machine when the collet again grips it in readiness for another cycle of operations in which the tools carried by a turret are moved both axially and transversely.

In such apparatus certain difficulties arise when a bar is fed forward until there remains only a short remnant which is not of sufficient length to be gripped firmly by the collet when in the proper position for tooling. At this stage it is necessary to eject the remnant and to follow it as quickly as possible by the forward end of another long bar so that another series of steps forward and corresponding tooling operations may be carried out on the forward end of the new bar without delay.

In such previous practice it has been usual to provide means for pushing the short remnant of bar forwardly through the collet so that it is ejected into the machine in such a way as to fall clear of the tools. The main disadvantage of this method of ejection is that the remnant may not fall clear of the tools and may then create difficulties as regards the forward movement of the front end of the following bar and may even cause damage to some parts of the machine.

The second disadvantage concerns the difficulty of bringing the new bar forward into operation with the necessary rapidity to avoid delay in starting a new series of tooling cycles.

In the present invention the remnant is withdrawn rearwardly before ejection thus avoiding the difficulty that it may fall into or damage the machine. Further, the remnant is separated from the delivered parts, this being of special importance if the parts have to be fed to another machine.

The invention consists in the novel features and in the combinations and constructions hereinafter set forth and claimed.

The plunger is reciprocated within predetermined limits by any known means which may include a pneumatic, electric, hydraulic or other motor or mechanism; for example, the pneumatic means described in U.S. Patent No. 2,595,522. During forward movement it moves step by step, each such step taking place only from the instant when the bar is released from the machine collet to the instant when its forward end engages the positioning stop on the machine turret.

The return movement which is continuous starts when the plunger is moved to the predetermined forward limit.

The invention comprises automatic actuating mechanism for feeding bar stock through the head of an automatic machine tool and for effecting a bar changing operation comprising in combination, a collet in the machine adapted to be opened to admit and closed to grip the bar; a bar stop in the machine movable into position to limit the forward feeding movement of the bar; a tube coaxial with the collet and divided longitudinally, said tube being adapted when opened to admit a bar transversely to replace the last used bar; a rack or holder for bars parallel to the divided tube and delivered one at a time into the tube when open; an undivided breach tube extending rearwardly of the divided tube and coaxial therewith, the feed plunger when retracted entering this breech tube and being then clear of the divided tube; a feed plunger guided in the coaxial tubes whereby the bar is pushed forwardly when the collet is opened until the bar contacts the bar stop; an abutment so positioned relatively to the bar stop that forward movement of the feed plunger is stopped when the forward end of the bar fails to reach the bar stop thereby initiating a bar changing operation; means for returning the feed plunger and the remnant of the bar rearwardly when the plunger reaches said abutment; resilient means for urging said ejector pin rearwardly to a limited extent relatively to the pusher rod.

In the embodiment of the invention shown by way of example in the accompanying drawings:

FIGURE 1 shows a diagrammatic side elevation of the bar feeding apparatus and the head of the machine;

FIGURE 2 shows a part vertical section on the centre line of the head of the machine together with the forward end of the bar feeding apparatus;

FIGURE 4 shows a longitudinal section of the bar feeding holder;

FIGURE 5 shows a longitudinal section of the feeding holder when near the forward end;

FIGURE 6 shows a further view with the feeding holder near the start of the withdrawal movement;

FIGURE 7 shows the feeding holder fully withdrawn in the remnant ejection position.

FIGURE 8 shows a longitudinal section of a modification of the bar feeding holder shown in FIGURE 4;

FIGURE 9 shows a longitudinal section of a further modification of the bar feeding holder;

FIGURE 10 shows a side elevation of part of a bar feeding tube provided with means for ejecting a remnant of the bar;

FIGURE 11 shows a section of a divided bar feeding tube on the line 11—11 of FIGURE 10;

FIGURE 12 shows a section of the bar feeding tube on the line 12—12 of FIGURE 10; and FIGURE 13 shows a pivoted stop for bringing remnant discharge means into operation.

Figure 3:
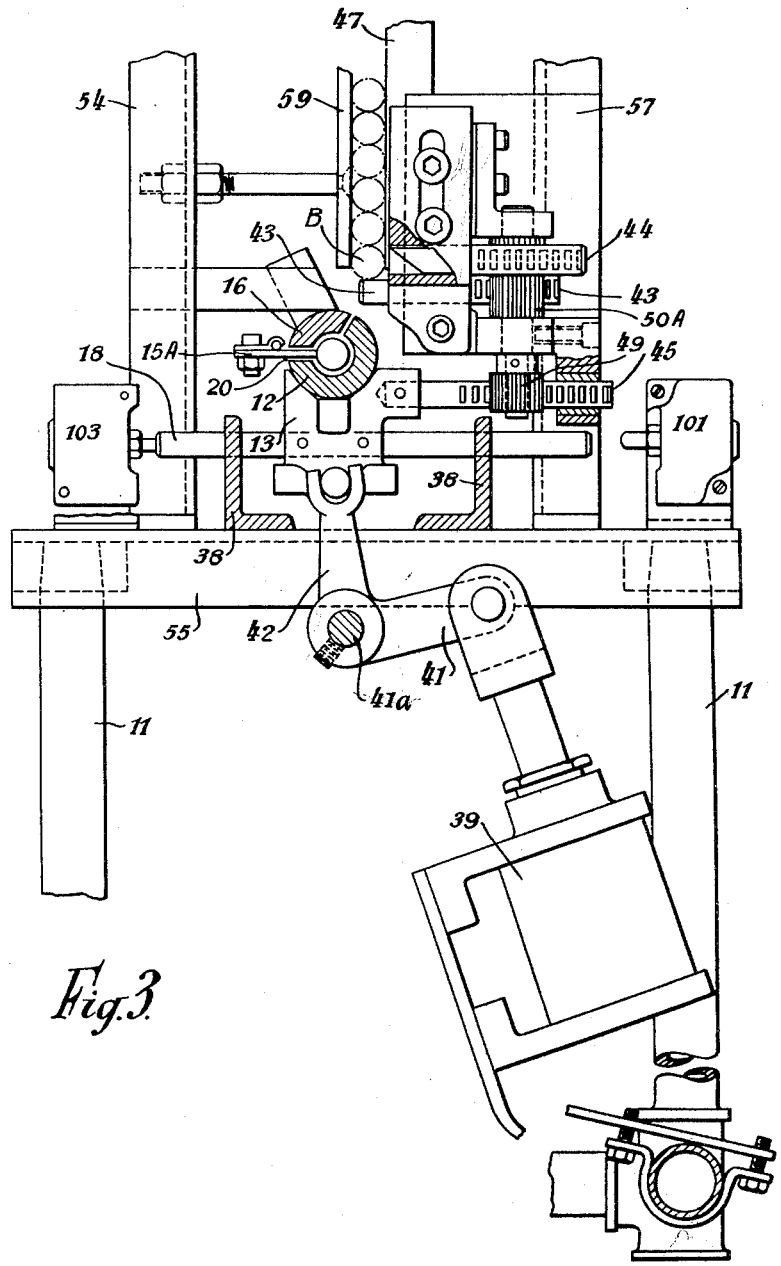
FIGURE 3 shows a transverse section of the feeding apparatus.

The general construction of a bar feeding machine of known type in which the bar is fed forwardly in a longitudinally divided tube will first be described, together with its association with an automatic machine.

Referring to FIGURES 1 to 3 of the drawings, one of the bars B is fed through a rotating hollow spindle 1, the forward end of which is rotatable with a collet 2 for gripping the bar. The collet operates with the usual opening and closing movement and is actuated by a sleeve 3 which is adjusted axially by connections, not shown, from a yoke lever 4 carried on the head H of the machine by a pivotal support 14; the yoke lever works in a groove 5 in an axially adjustable collar 6.

The opening and closing of the collet 2 on the competion of a series of machining operations on a long bar also actuates a spring loaded swing stop 7 of usual construction which limits the forward movement of a new bar and is held out of action during the series of cutting operations. During such cutting operations the forward feeding of the bar into each of the successive positions is limited by a stop 17 which may be carried by the turret of the machine.

The mechanism of the machine also includes a normally engaged clutch which controls the driving or stopping of the rotating spindle and the operations of the turret and tools as well as the opening or closing of the collet so that the machine stops when the collet is opened. The clutch is actutaed by the shift lever 8 which is adjusted in the present application by the automatic operating mechanism for the bar feed.

The spindle is rotated in either direction by one of the oppositely rotated belt pulleys 9, 10. Either pulley is clutched to the spindle by a manually shiftable collar C and the other is declutched. The shift lever 8 clutches or declutches whichever pulley is in operation.

The mechanism of the machine tool per se forms no part of the invention although the two operate in a closely defined relationship.

The bar feed mechanism and all parts associated therewith are mounted on a long independent structure or framework shown diagrammatically in FIGURE 1, some of the constructional features being shown in the transverse section FIGURE 3, to enable the application thereto of the present invention to be understood.

The structure extends lengthwise so that a bar carried thereby may be fed directly into the open end of the rotatable tubular spindle 1 on the head H of the machine.

Each structure includes a plurality of transverse frames, for example five, F1, F2, F3, F4, F5, as shown in FIGURE 1, the frames being well spaced from one another longitudinally and connected or cross braced as required.

Each transverse frame comprises, as shown in FIGURE 3 (a), a lower part with vertical members 11 and horizontal members 55 and (b) a narrower upper part with vertical members 47, 54, 57. The transverse frames are connected to form the structure by longitudinal members 56.

Some of the parts shown in FIGURE 2 will be found on all of the transverse frames and other parts only on a transverse frame located at or near the middle of the structure.

A bar stock B is rotatably supported when the machine is operating in a non-rotatable divided guide tube T including a body or cradle segment 12 mounted on carriages 13 each carried by its transverse frame. The carriages 13 are slidable on fixed bars, not shown, carried by longitudinal angle plates 38 so as to move laterally into and out of alignment with the rotatable spindle in the machine head. One of the fixed bars on one of the carriages 13 is replaced by a slidable bar 18 fixed to the carriage as shown in FIGURE 3, and adapted to actuate valves 101, 103 forming part of the automatic control system.

The guide tube T also includes a stationary segment 16 so that the major part of the guide tube T, that is the cradle segment 12 mounted on the carriage 13, separates from the segment 16 during lateral movement to the right, as viewed in FIGURE 3, to pick up a new bar B from the magazine to be described hereinafter. The opening 20 between the segments 12, 16 remains open when the tube T is closed to allow movement lengthwise of the feed plunger plate 15A.

The carriages 13 and cradle segments 12, in all the transverse frames are traversed simultaneously by arms 42 secured to a longitudinal shaft 41A which is rotated through a small angle by an arm 41 actuated by an operating member 39 such as a pneumatic cylinder and piston. The open period is short being only sufficient to allow movement of the new bar into the divided tube.

It is to be understood that this particular method of separating the two parts of the tube is only exemplary.

The bars B are shown stacked in a vertical magazine between a side plate 59, and a frame member 47 at each of the frame positions, but the bars may be carried otherwise for example on inclined racks so that the lowermost bar may roll between the then separated parts of the tube T.

In the particular construction shown, the lowermost bar is released and the others retained in the magazine, after moving downwardly one diameter, by transversely slidable escapement bars 43, 44. These two bars are displaced so that toothed racks, one on each bar, may engage opposite sides of an extended toothed pinion 50A whereby the two bars move simultaneously in opposite directions. The two bars are moved in this way by a toothed pinion 49 secured on the spindle to which the long pinion 50A is also secured. A rack 45 secured to the cradle 13 thus ensures feeding of the lowermost bar into the divided tube when the tube has been opened; the closing movement follows immediately.

In line with the divided tube and at the rearward end remote from the head of the machine, there is provided a complete undivided breech tube 12A of the same diameter rigidly mounted on the bar feeding structure. This tube receives the feed plunger 15, when it is fully retracted, so that the new bar may drop or roll freely into position when the divided tube T is opened. The breech tube is formed with an open longitudinal slot 21 coaxial with the opening 20 in the divided tube T to allow longitudinal movement of the feed plunger plate 15A.

The feed plunger 15 when at the forward end must project some distance into the machine head so as to utilise the bar as far as possible and waste very little on the remnant. The breech tube 12A at the rearmost end must therefore be long enough to accommodate a long feed plunger so that it is clear of the divided tube T.

When the new bar B is in position and the divided tube T is closed, the feed plunger moves forwardly out of the breech tube 12A and into the divided tube T until it engages the rear end of the new bar after which it pushes the bar forwardly until its forward end engages the swing stop 7 which is then in its lowered position. It will be understood that the actuating force is desirably of a resilient character such as is provided by pneumatic actuation and may be of the type shown in U.S. Patent No. 2,595,522.

As soon as the forward movement of the bar thus ceases, the machine collet 2 is closed, the swing stop 7 raised and the machine restarted. The bar then rotates while the feed plunger is stationary but is held in contact with the rear end of the bar by the resilient force continuously applied to the plunger. An anti-friction thrust bearing 22 between two parts of the plunger allows this relative rotation to take place freely.

The forward end of the bar is then removed by the usual parting tool and on the completion of the time period of the cycle, the machine collet 2 is opened, the machine stopped and the bar again moved forwardly by the feed plunger until the machined end engages the turret stop 17. The collet is then closed and the machine restarted on the first effective series of tooling operations on the new bar.

The feed plunger 15 is connected to a feed plunger plate 15A which projects from the tube B through the gap 20 between the two parts and may be secured to suitable actuating means such as a cable extending lengthwise more or less alongside the divided tube, the cable being actuated in either direction in conjunction with the means for stopping and starting the machine and opening and closing the collet.

The foregoing description outlines the operation of one example of a bar feeding machine in this known limited field in which a longitudinally divided tube is employed.

When a series of operations on a long bar has been completed and only a remnant of insufficient length remains, this remnant, in accordance with the present invention, is withdrawn rearwardly by gripping mechanism when released from the machine collet and is moved rapidly towards and into the breech tube 12A at the rear end of the feeding structure. The remnant is then ejected laterally, the divided tube T being opened at the same time to admit a new bar and immediately closed. The forward movement of the pusher 15 then commences.

The forward feeding operation is then effected by the feed plunger 15, shown in FIGURE 4, including spring gripping mechanism, the plunger being given a controlled reciprocating motion equal to the full travel of the bar by known means. The bar engaging part of the plunger is conveniently in the form of a collet 19 having separate jaws engaging the circumference of the bar at its rear end with sufficient spring gripping force to ensure withdrawal of the remnant finally. The full force of the feed plunger actuating mechanism can only be exerted when the new bar engages the swing stop 7 in the machine. This brings about complete entry and adequate gripping force.

Some variation or adjustment of the mechanism may be made to suit the cross-section of the bar; but in general interchangeable bar engaging members on the feed plunger should be employed each adapted for use with a particular diameter or shape of bar. A square or hexagon or other bar for example may require the use of an engaging member of appropriate sectional shape. The gripping action must not be excessive, but must allow relative axial movement of the jaws and the remnant to enable ejection of the remnant to be carried out.

The gripping element, shown in FIGURES 4 to 7, includes a stem 23 which is screwed into a holder 24 and is secured therein against rotation by a set screw 25. The forward or end part of the element is bored out to a slightly smaller diameter than the rod and is divided by longitudinal saw cuts 26 extending into drilled holes 27, to provide the desired yield and gripping force on the bar. The gripping element is readily interchangeable to suit any diameter of feed plunger within the limits of the apparatus.

Between the holder and the forward end of the feed plunger body 32 is interposed a thrust race 22 and a thrust race protector 28, the several parts being held together by a spigot 29 with a head 30 engaging a shoulder 31 in the holder 24 while the stem of the spigot is a push fit in the body 32 of the feed plunger 15.

An ejector pin 33 is slidable longitudinally in the feed plunger body 32 within limits set by the dowel pin 34 in the ejector pin and the slot 35 in the body 32. A helical spring 36 interposed between the rearward end of the spigot 29 and a shoulder on the ejector pin 33 retains the ejector pin normally in its rearward position. The spring 36 encircles the reduced part 56 of the ejector pin.

The feed plunger assembly is reciprocated in the tube by the feed plunger plate 15A welded or otherwise secured to a sleeve 40 rigidly mounted on the feed plunger body 32, the plate being connected to an actuating member moved longitudinally as required by pneumatic or other actuating means. The body 32 is supported non-rotatably within the divided tube T by the sleeve 40, by the centre support 45 and by the bar holder 24 which is rotatable with the bar.

FIGURE 5 shows the forward end of the feed plunger when the last full length work piece 46 has been positioned by the stop 17. The bar gripper 19 with associated parts has at this stage entered the machine collet 2. When this last workpiece 46 has been cut off and has fallen into a receptable or been otherwise removed, the machine collet 2 opens and the machine stops. The feed plunger is then moved forwardly until the end of the bar gripper 19 engages a shoulder 57 in the collet 2 as shown in FIGURE 6. If the remanent 48 of the bar is then too short to engage the stop 17 it is also too short to make a new component and to provide sufficient length for rigid support by the machine collet 2.

During this final movement, the plunger reaches its predetermined limit and it is then automatically reversed and moves rearwardly rapidly taking the remanent with it. At or near the end of this rearward movement the remnant is discharged. The apparatus is then ready for the insertion of a new bar.

When the plunger assembly completes its withdrawal stroke, it is clear of the divided tube T and is located in the breech tube 12A as shown in FIGURE 7. During the last part of this movement, the rear end of the ejector pin 33 engaged a fixed stop 52, the push rod body 32 continuing its movement so that the remnant 48 is ejected from the bar feed gripper 19 by the reduced end 56 of the ejector pin 33 and falls away downwardly through an opening 53 in the divided tube T or in the breech tube 12A. During this operation the helical spring 36 is compressed.

The divided tube T is then open opened and closed quickly, the open period being, however, sufficiently long to allow the lowermost tube in a magazine or rack to drop or roll into the tube.

The plunger assembly next commences another forward movement until the feed gripping element 19 engages the rear end of the new bar and moves the bar forward so that its forward end engages the swinging stop 7, the gripping jaws being then expanded by further forward movement of the pusher assembly to grip the end of the bar. The machine is then restarted and the collet grips the bar and commences to rotate. The end of the bar is then cut off and falls away, the collet is opened, the bar moved forward by the feed plunger until the end contacts the turret stop 17 and a new series of machining cycles commences and continues until the bar is used up.

In a modified construction, shown in FIGURE 8, the stem 23 of the gripping element 19 is rotatable in a self-lubricating bush 58 which is secured in the body of the holder 15 by a key 61 in the shape of a segment of a circle retained in position by a ring 62 held against endwise movement by two spring rings 63. The ball thrust bearing in this construction is interposed between a shoulder on the gripping element 19 and the end of the holder 15. Disengagement of the stem 23 from the bearing is prevented by a spring ring 65. The forward end of the helical spring 66 abuts against a washer held in the holder by a spring ring 64.

A further modification of the pusher assembly, shown in FIGURE 9, has been designed for withdrawing and ejecting long remnants before the stock pusher has reached the limit of its rearward travel. The gripping element 19 is formed with a stem 23 mounted in a self-lubricating bush 58 which is similarly held in the end of the holder or pusher tube 32 by a key 61 in the form of a cylindrical segment. The key in this form is, however, held in position by a spring ring 68 entering an annular recess in the holder.

The ejector pin 69 is formed at its forward end with a tip 71 of greater diameter so as to deal with tubes as well as bars, the tip being located in an enlarged part of the gripping element 19. The stem of the ejector pin 69 extends rearwardly and is held normally in the retracted position by a first helical retractor spring 73. A spring 74 engaging a thrust washer 75 in contact with the end of the bush 58 prevents forward movement of the gripping element 19 relatively to the bush.

A ball thrust bearing 72 is interposed between the enlarged rearward end 76 of the ejector pin 69 and the enlarged forward end 77 of a connecting pin 78 slidable lengthwise in a reduced part 85 of the holder. The rearward end 84 of the connecting pin is reduced in diameter and screwed into the forward end of a striking rod 79. A lock nut 81 holds the two parts against rotation and a second helical return spring 82, interposed between a washer 83 adjacent the lock nut and a shoulder on the part 85 of the holder, retracts the striking rod and connecting pin until the head 77 of the connecting pin engages a shoulder on the holder.

The range of movement of the striker rod 79 longitudinally of the holder tube is limited by a pin and slot connection, not shown, similar to that shown at 34, 35 in FIGURE 4. The first helical spring 73 ensures that the ejector pin 69 and the thrust bearing 72 follow up the head 77 of the connecting pin 78. The operative thrust of the striking rod 79 is transmitted to the ejector pin in opposition to the two helical springs.

It is not necessary to withdraw the remnant fully into the breech block before it is ejected and drops away downwardly. For example, in the arrangement shown in FIGURE 7 and hereinbefore described, the remnant 48 is ejected while it is still within the rearward end of the divided tube T, a longitudinal opening 53 in the lower part of the tube allowing the remnant to fall away.

The ejection operation may however be carried out anywhere rearwardly of the machine tool collet or other equivalent gripping mechanism. Preferably the remnant is ejected at some point or region along the length of the divided tube T. Referring to FIGURE 1, a convenient position is between the third and fourth transverse frames F3, F4, which include racks or members for the stack of bars. A suitable arrangement is shown diagrammatically in FIGURE 10, this construction being adapted for use with the pusher assembly shown in FIGURE 9. A lowermost section 86 of the divided tube T between the frames F3, F4 is cut away so that it may be moved laterally with the movable part of the divided tube when the tube is opened to receive a new bar. This section 86 is supported at its ends within brackets 87, one of which is shown in transverse section in FIGURE 12.

The divided tube in this form of construction is shown in transverse section in FIGURE 11 and consists of a member which is externally of rectangular section with a longitudinal circular opening 95 therein.

The tube, as shown in both FIGURES 10 and 11, is divided at one side by a longitudinal groove 20 to allow the passage of the feed plunger plate 15A by which a cable 88 moves the feed plunger longitudinally.

The rectangular tube is of the section shown in FIGURE 11 over the whole of its length, except that part shown in the cross sectional view FIGURE 12 which includes the lowermost cut-away section 86 between the two frames F3, F4.

Referring first to FIGURE 11, the fixed or supporting section consists of two parts 89, 90 rigidly connected or formed as a single part. The movable or covering section 91 is adjustable towards the right to open the tube for the reception of a fresh rod.

In FIGURE 12, the fixed section consists of two parts 89, 90A rigidly connected as shown or formed as a single part and the movable section consists of the upper part 91 and the lower part 86 both rigidly connected, as for example by a U-shaped bracket 92 connected to said parts by set bolts 93. The tube when opened first allows the remnant to fall downwardly and after a short interval, the feed plunger travels into the breech tube 12A and the new bar enters the open tube T which is then closed.

It will be obvious that the construction shown in FIGURES 11 and 12 could be so actuated that the supporting parts 89, 90 of the main tube and 89, 90A of the section 86 could be movable together and the covering part 91 of the main tube as well as the section 86, could be fixed. As a further possibility both parts could be moved simultaneously in opposite directions. In any case the movement would make provision for the removal from the divided tube T of each remnant after it has been ejected from the gripping means.

The ejection of the remnant in such a forward location calls for a yielding stop for the ejection rod 79 so that the feed plunger elements may continue their rearward travel into the breech tube 12A after the remnant has been ejected. A suitable construction of stop is shown, by way of example, in FIGURE 13 as applied to a divided tube T of rectangular section, as shown in FIGURE 11.

An ejector pawl 96 forming the stop is mounted by means of a pivot 97 above the upper flat surface of the tube T and extends downwardly into a longitudinal slot 98. Lugs 99 on the sides of the pawl carry screwed stops 104 which are adjusted to maintain the pawl in such a position that when the feed plunger body 32 is moved rearwardly, the lower end of the pawl will engage the striking rod 79. The pawl 96 thus first engages the flat end of the striking rod 79 and stops its rearward movement. Further rearward movement of the pusher tube brings about the release of the remnant from the gripping collet 19, shown for example in FIGURE 9. After still further rearward movement of the feed plunger body 32, the end of the pawl 96 runs up the inclined end 105 of the body. The pawl is maintained in this raised position by contact with the upper part of the body 32 during further rearward movement.

I claim:

1. Stock bar feed apparatus for use in connection with automatic bar working machines, said apparatus comprising a stock bar guide tube for guiding the stock bar into said machine, the forward end of said tube being arranged in juxtaposition to the bar working machine, said tube being formed in its rearward portion with a bar remnant ejection slot, a bar pusher mounted for forward and return movement in said guide tube, means for moving said stock bar pusher forwardly to feed the stock bar into said bar working machine, said pusher having means for yieldingly gripping the rear end of the stock bar, and means for engaging the rear end remnant portion of the stock bar and operable upon movement of said pusher into the rear portion of said guide tube for ejecting said remnant portion of the bar from said pusher through said ejection slot.

2. Stock bar feed apparatus comprising a stock bar guide tube with the front end thereof positioned in proximity to a bar working machine, a stock bar pusher slidably mounted in said tube for forward and return movement and having means for yieldingly gripping the rear end of the stock bar, a movable ejector pin located centrally within said feed pusher or plunger means; and means in the said tube for stopping rearward movement of the ejector pin while allowing further rearward movement of the feed plunger means, whereby the forward end of the ejector pin ejects the remnant of the used rod from the gripping device.

3. Stock bar feed apparatus as claimed in claim 2, in which the ejector pin is normally held in a rearward position relatively to the feed plunger by a spring, while its rearward end projects rearwardly beyond the feed plunger so as to engage a stop when the feed plunger is withdrawn rearwardly, whereby the forward end ejects the remnant.

4. Stock bar feed apparatus as claimed in claim 2, in which the abutment in the breech tube for stopping rearward movement of the ejection pin during a part of the retracting movement of the feed plunger is then rendered inoperative so as to allow further rearward movement of the plunger and the ejection pin.

5. Stock bar feed apparatus as claimed in claim 2, in which the abutment in the breech tube consists of a ratchet pawl which enters a slot in the tube so as to check movement of the ejection pin but not of the feed plunger.

6. Stock bar feed apparatus as claimed in claim 2, in which the rearward end of the feed plunger is inclined so as to push the pawl transversely clear of the plunger after the remnant has been ejected.

References Cited in the file of this patent

UNITED STATES PATENTS

| | | |
|---|---|---|
| 2,595,522 | Harney | May 6, 1952 |
| 2,626,451 | Gridley | Jan. 27, 1953 |
| 2,626,452 | Gridley | Jan. 27, 1953 |
| 2,709,598 | Retz | May 31, 1955 |
| 2,906,003 | Lakins | Sept. 29, 1959 |